(12) United States Patent
Shah et al.

(10) Patent No.: US 11,036,933 B2
(45) Date of Patent: Jun. 15, 2021

(54) USER INTERFACE COMPONENT AUTOWIRING

(71) Applicant: Oracle International Corporation, Redwood Shores, CA (US)

(72) Inventors: Nitin Shah, Pleasanton, CA (US); Rajiv Kumar Malhotra, Bangalore (IN); Vidya Viswanathan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 690 days.

(21) Appl. No.: 14/800,855

(22) Filed: Jul. 16, 2015

(65) Prior Publication Data
US 2016/0092425 A1    Mar. 31, 2016

(30) Foreign Application Priority Data

Sep. 25, 2014  (IN) .......................... 4702/CHE/2014

(51) Int. Cl.
| | |
|---|---|
| *G06F 40/186* | (2020.01) |
| *H04L 29/08* | (2006.01) |
| *G06F 3/0484* | (2013.01) |
| *G06F 40/143* | (2020.01) |

(52) U.S. Cl.
CPC ........ *G06F 40/186* (2020.01); *G06F 3/04842* (2013.01); *G06F 40/143* (2020.01); *H04L 67/02* (2013.01)

(58) Field of Classification Search
CPC . G06F 8/38; G06F 8/34; G06F 17/248; G06F 17/2247; G06F 17/272; G06F 40/14; G06F 40/221; G06F 40/186; G06F 16/958; G06F 16/972; G06F 16/986; G06F 8/00–78; H04L 67/02; H04L 69/16
See application file for complete search history.

(56) References Cited

U.S. PATENT DOCUMENTS

| | | | |
|---|---|---|---|
| 6,023,271 A * | 2/2000 | Quaeler-Bock | G06F 9/451 715/866 |
| 6,262,729 B1* | 7/2001 | Marcos | G06F 8/20 715/744 |
| 7,574,712 B2 | 8/2009 | Allamaraju et al. | |
| 7,788,340 B2 | 8/2010 | Jolley et al. | |
| 2002/0169852 A1* | 11/2002 | Schaeck | G06F 17/3089 709/218 |

(Continued)

OTHER PUBLICATIONS

"WSRP Architecture"; http://portals.apache.org/wsrp4j/arch/; last downloaded on Apr. 5, 2015.

(Continued)

*Primary Examiner* — David S Posigian
(74) *Attorney, Agent, or Firm* — Potomac Law Group, PLLC

(57) ABSTRACT

A system that generates a visualization user interface. The system receives a selection of a data source, and receives a selection of a visualization template that includes metadata. The system further receives a selection of data attributes corresponding to the data source. The system parses the visualization template for the metadata, and replaces the metadata with binding between a visualization component and the data source. The system then generates the visualization user interface using the visualization component.

20 Claims, 13 Drawing Sheets

(56) References Cited

U.S. PATENT DOCUMENTS

| | | | | |
|---|---|---|---|---|
| 2003/0110448 A1* | 6/2003 | Haut | ................. | G06F 17/30581 715/241 |
| 2004/0001092 A1* | 1/2004 | Rothwein | ................. | G06F 8/38 715/763 |
| 2005/0177815 A1* | 8/2005 | Kurz | ................. | G06F 9/4443 717/104 |
| 2006/0075382 A1* | 4/2006 | Shaburov | ................. | G06F 8/34 717/106 |
| 2006/0112399 A1* | 5/2006 | Lessly | ................. | G06F 8/38 719/318 |
| 2007/0061740 A1* | 3/2007 | Marini | ................. | G06F 8/38 715/762 |
| 2007/0061819 A1* | 3/2007 | Kothari | ................. | G06F 9/44 719/328 |
| 2010/0095197 A1* | 4/2010 | Klevenz | ................. | G06F 16/972 715/234 |
| 2011/0088011 A1* | 4/2011 | Ouali | ................. | G06F 8/10 717/105 |
| 2013/0046894 A1* | 2/2013 | Said | ................. | G06F 9/547 709/226 |
| 2014/0046980 A1* | 2/2014 | Kleinschmidt | ................. | G06F 40/14 707/793 |
| 2014/0089395 A1* | 3/2014 | Atsatt | ................. | H04L 67/38 709/203 |
| 2014/0181788 A1* | 6/2014 | Sullivan | ................. | G06F 8/38 717/109 |
| 2014/0215307 A1 | 7/2014 | Schneider et al. | | |

OTHER PUBLICATIONS

Wikipedia, the free encyclopedia; "Web Services for Remote Portlets"; https://en.wikipedia.org/wiki/Web_Services_for_Remote_Portlets; last downloaded on Apr. 5, 2015.

* cited by examiner

Employee Details

600

Monty
Employee ID : 0
Having 4 year(s) of experience
Getting Rs.500 as salary per month.

Vicki
Employee ID : 1
Having 5 year(s) of experience
Getting Rs.1000 as salary per month.

Carl
Employee ID : 2
Having 6 year(s) of experience
Getting Rs.2000 as salary per month.

Asok
Employee ID : 3
Having 7 year(s) of experience
Getting Rs.3000 as salary per month.

Weblogic
Employee ID : 2
Having 6 year(s) of experience
Getting Rs.2000 as salary per month.

Ram
Employee ID : 2
Having 6 year(s) of experience
Getting Rs.2000 as salary per month.

Sham
Employee ID : 3
Having 7 year(s) of experience
Getting Rs.3000 as salary per month.

Fig. 6

USER INTERFACE COMPONENT AUTOWIRING

FIELD

One embodiment is directed generally to a computer system, and in particular to a computer system that generates a portal web site.

BACKGROUND INFORMATION

Generally, a web site is an arrangement of content, such as text, images, and sound, on a set of web pages configured for presentation over a computer network in a predetermined way. The content appearing on a web page is generally stored in a centralized location, such as a database or a set of files, that is local to a web server. Requests for web pages, which are typically transmitted by web browsers via the Hypertext Transfer Protocol ("HTTP") protocol, are processed by the web server. Centralizing the storage of the content found on web pages facilitates its transmission by the web server because the web content is in a known location that is readily available.

Web sites have become more complex as their application has spread. Web sites have proven to be a valuable means of communication both with the public (e.g., a corporate web site) and in private use (i.e., an Intranet site). In either case, it is advantageous to display content with as much breadth and depth as possible to maximize the utility of the web site to its users. However, as web content becomes more complex and diverse, the amount of time, money and effort in obtaining, storing and updating the web content has increased.

More recently, portal web sites, or "web portals", have been used to deliver complex and diverse content over a computer network. A web portal is a web site containing one or more portlets displayed on a web page. A portlet is a configurable content area displayable on a web page that provides content or performs one or more associated functions, or both. Portlets may display content that is obtained from a source remote from the web server. For example, a portal web site may use an arrangement of portlets to display web content on different subject areas. A portlet can be considered any reusable component that complies with the portlet standard. The web content for each of the subject areas need not be stored centrally to the web server, but instead may be stored in a plurality of locations geographically removed, but accessible to the portal web server. A portlet may be configured such that it may display the information it obtains to the web browser in a customized manner.

SUMMARY

One embodiment is a system that generates a visualization user interface. The system receives a selection of a data source, and receives a selection of a visualization template that includes metadata. The system further receives a selection of data attributes corresponding to the data source. The system parses the visualization template for the metadata, and replaces the metadata with binding between a visualization component and the data source. The system then generates the visualization user interface using the visualization component.

BRIEF DESCRIPTION OF THE DRAWINGS

FIG. 6 is a screenshot of a user interface in response to the selected data source, visualization template and attribute options in accordance with one embodiment of the invention.

DETAILED DESCRIPTION

Embodiments provide a template that includes an expression language ("EL"). In order to autowire user interface ("UI") components for a web portal, the EL is parsed and replaced with binding between a View and Model. The web portal is then generated with the UI components wired to the data sources.

Figure 1:
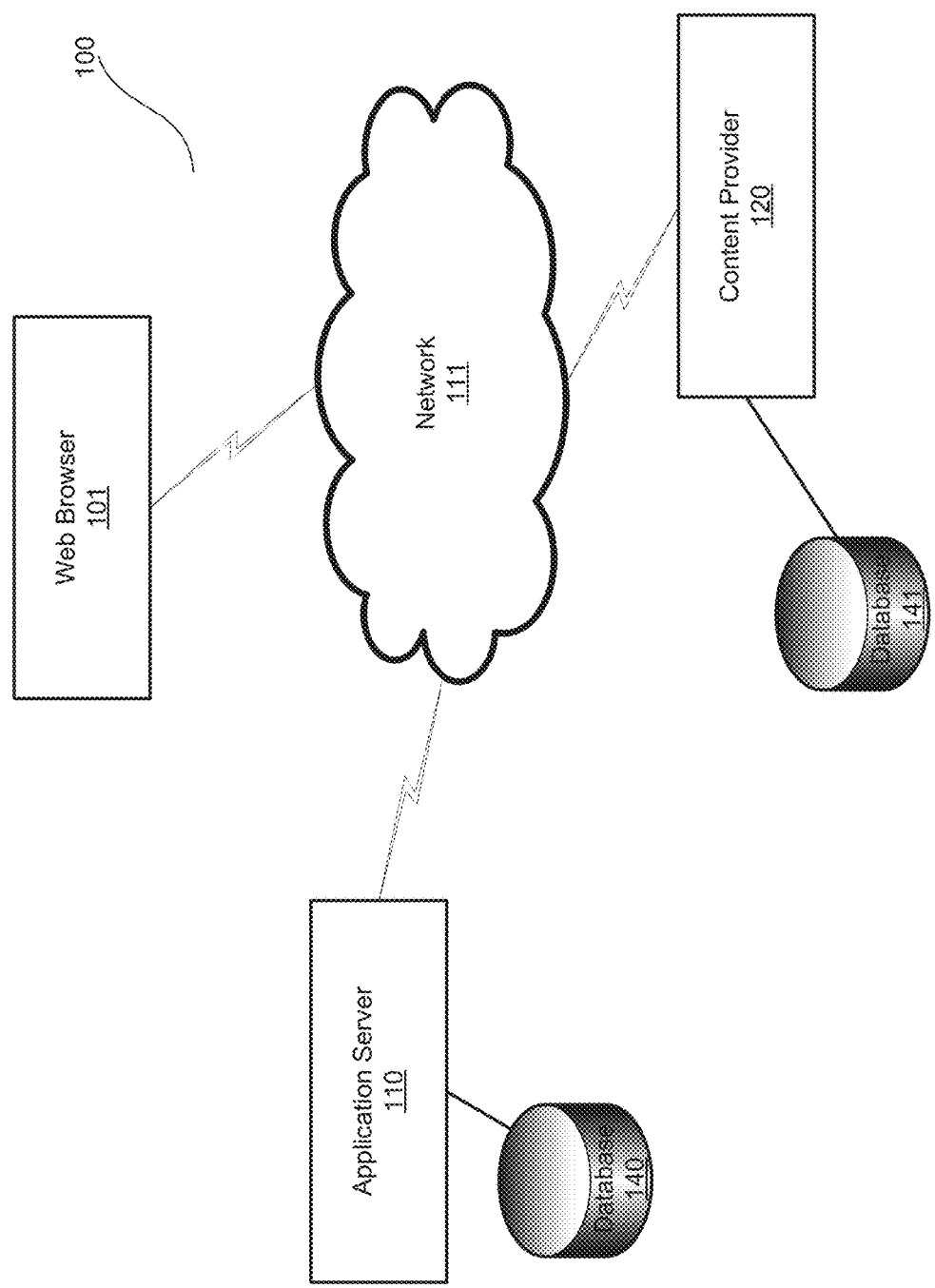
FIG. 1 is an overview diagram of a portal management system including network elements that implement embodiments of the present invention and/or interact with embodiments of the present invention.

FIG. 1 is an overview diagram of a portal management system 100 including network elements that implement embodiments of the present invention and/or interact with embodiments of the present invention. Portal management system 100 allows a user to manage the appearance and operation of a web site and the content appearing on the web site. Portal management system 100 includes a web browser 101, an application/web server 110, databases 140, 141, and a content provider 120.

A web browser 101 is any device capable of browsing content over a computer network 111, such as the Internet, and is operatively connected to application server 110. While only one web browser 101 is shown in FIG. 1, multiple web browsers 101 may be operatively connected to application server 110. Web browser 101 and application server 110 may communicate over computer network 111 using well-known communication protocols, such as Transmission Control Protocol ("TCP") and Internet Protocol ("IP"), or TCP/IP, HTTP and Extensible Markup Language ("XML").

In one embodiment, application server 110 is a well-known component that assembles and serves web pages to one or more web browsers 101. Application server 110 in one embodiment functions as an underneath middleware framework, and further includes applications such as Java 2 Platform, Enterprise Edition ("J2EE") applications. As such, application server 110 may serve web pages containing one or more portlets. A portlet is a configurable content area displayable on a web page that displays content obtained from a source remotely to the web server, or performs one or more functions remotely to the web server. A portlet may be configured such that it may display customized information to a user. A portlet can be considered any reusable component that complies with the portlet standard (i.e., the Java Portlet Specification 2.0 (JSR 286)). In one embodiment, Application Development Framework ("ADF") task flows are considered portlets.

A content provider 120 is a functional component that provides content for a portlet in response to requests from application server 110. Content provider 120 in one embodiment is software operating on a separate hardware device other than that executing application server 110. System 100 may include more than one content provider 120. In other embodiments, the functionality of content provider 120 and application server 110 can be implemented on the same network element. In some embodiments, content provider 120 may be implemented using a cross-platform component architecture such as the JavaBean architecture. Such an embodiment is advantageous when deploying content providers 120 over multiple platforms.

Application server 110 assembles the requested web page using any content received from content provider 120 and data stored in an associated central repository concerning the organization and presentation of the web page. In one embodiment, the data stored in the central repository that application server 110 uses in assembling the requested web page includes data concerning the following attributes of the web page: style, layout, content resident thereon, portlets displayed thereon, items displayed thereon, groups, folders and user permissions for the web page. In other words, application server 110 manages data concerning the appearance and operation of portal web sites in a central repository, such as a database, and uses that information to assemble the web page, along with content received from content providers 120. The data application server 110 uses in rendering web pages may be directed towards visual aspects of the page (e.g., style or layout information), or it may be directed towards operational aspects of the page (e.g., what portlets are displayed, permissions regarding access to portions of the web page, etc.). In embodiments of the invention, web pages are dynamically generated based upon data stored in tables in a database, including databases 140, 141.

Figure 2:
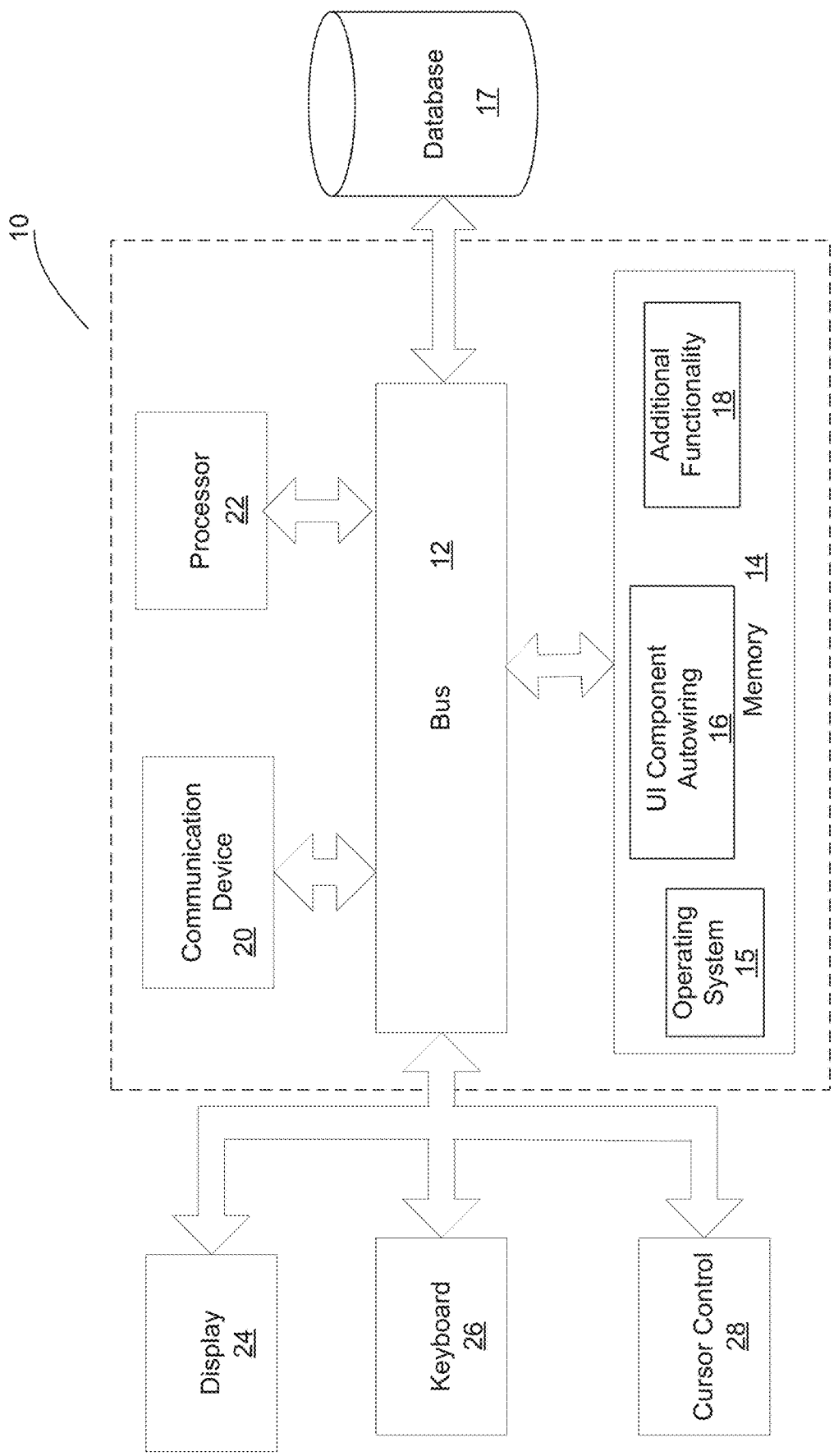
FIG. 2 is a block diagram of a computer server/system in accordance with an embodiment of the present invention.

FIG. 2 is a block diagram of a computer server/system 10 in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of application server 110, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a UI component autowiring module 16 for providing autowiring for UI components for a web portal, or other type of web page, and all other functionality disclosed herein. System 10 can be part of a larger system, such as added functionality to the "WebCenter Portal" from Oracle Corp. or the Application Development Framework ("ADF") from Oracle Corp. Therefore, system 10 can include one or more additional functional modules 18 to include the additional functionality. A database 17 is coupled to bus 12 to provide centralized storage for modules 16 and 18.

A web portal or any type of web page can include one or more UI components in order to show underlying data, or data received from a data source, referred to as "data visualization". Examples of UI components include a table, a chart, an input text box, an output text box, buttons, etc. For portals, such as business intelligence portals, many of the UI components display data from various data sources, such as enterprise application data. For example, a web portal may retrieve data from a human resource ("HR") enterprise system to show organization charts, or may retrieve data from a customer relationship management ("CRM") enterprise system to show sales opportunity business objects. However, in general, in order to wire the components to the various data sources, many UI development systems require knowledge of the data source attributes. As a result, a developer rather than a business user is typically required to generate portal web pages with UI components in order to create a data visualization.

In contrast, embodiments generate and provide a visualization template. A visualization template in one embodiment is a layout of place holders for one or more UI components that can be rendered onto a web page. The UI components need to be wired to a pre-configured data source, which can include: (1) a Representational State Transfer ("REST") uniform resource locator ("URL") that can provide data over Hypertext Transfer Protocol ("HTTP") or HTTP secure ("HTTPS"); (2) a database; (3) files with well-known formats such as XML or comma-separated values ("CSV"); (4) Simple Object Access protocol ("SOAP") based web services, etc.

One embodiment implements a Model-View-Controller ("MVC") design pattern. An MVC application is separated into: (1) a model layer that handles interaction with datasources and runs the business logic; (2) a view layer that handles the application user interface; and (3) a controller that manages the application flow and acts as the interface between the Model and the View layers.

The visualization template, in one embodiment, includes an expression language ("EL"). The EL in the template is used to provide "hints" of the structure and attributes of the back end data. The EL is parsed and replaced with binding between the View and the Model layer to create a fully functional data bound visualization. As a result, there is no need to know which data source attribute or method should be bound to which UI element. In one embodiment, the EL provides auto binding generation for an ADF framework.

Figure 3:
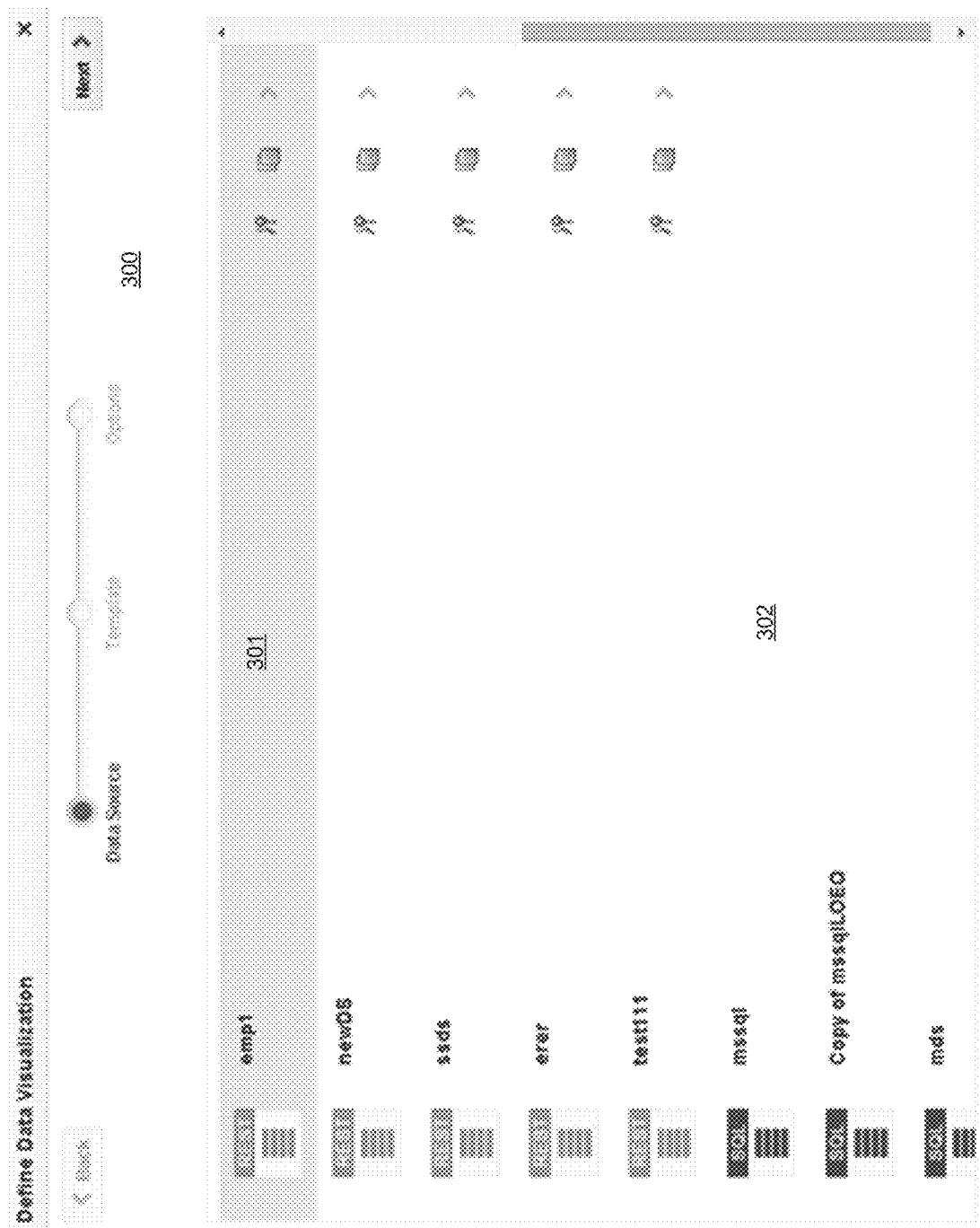
FIG. 3 is a screenshot of a user interface that allows a user to select a data source in accordance with one embodiment of the invention.

In general, in order to create a data visualization, a user will select a data source and a visualization template. FIG. 3 is a screenshot of a user interface 300 that allows a user to select a data source in accordance with one embodiment of the invention. As shown, the user is provided with a choice of pre-configured data sources to choose from, without having to know the underlying data attributes. For example, data source 301 is a REST URL data called "emp1" that may be provided in a JavaScript Object Notation ("JSON") format, XML format or some other format. Data source 302 is database data called "mssql" retrieved in response to a Structured Query Language ("SQL") query. In the example of FIG. 3, the user has selected data source 301, which is employee data retrieved from a human resource ("HR") system.

Figure 4:
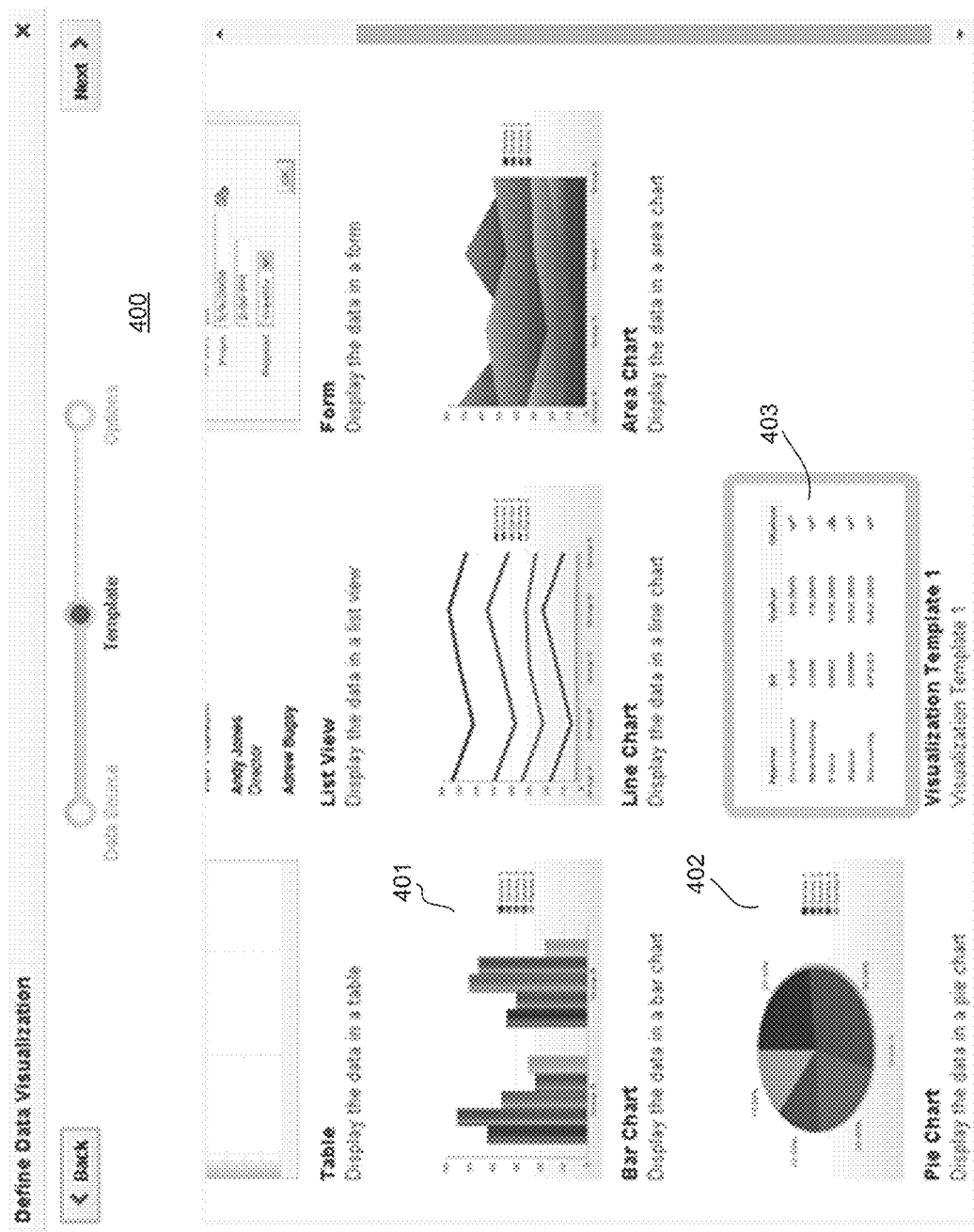
FIG. 4 is a screenshot of a user interface that allows a user to select a visualization template in accordance with one embodiment of the invention.

FIG. 4 is a screenshot of a user interface 400 that allows a user to select a visualization template in accordance with one embodiment of the invention. As shown in the example of FIG. 4, available visualization templates can include a bar chart 401, a pie chart 402, a "visualization template" 403, etc. The visualization templates are not bound with any specific data sources. They function as a placeholder. In the example of FIG. 4, the user has chosen visualization template 403.

Figure 5:
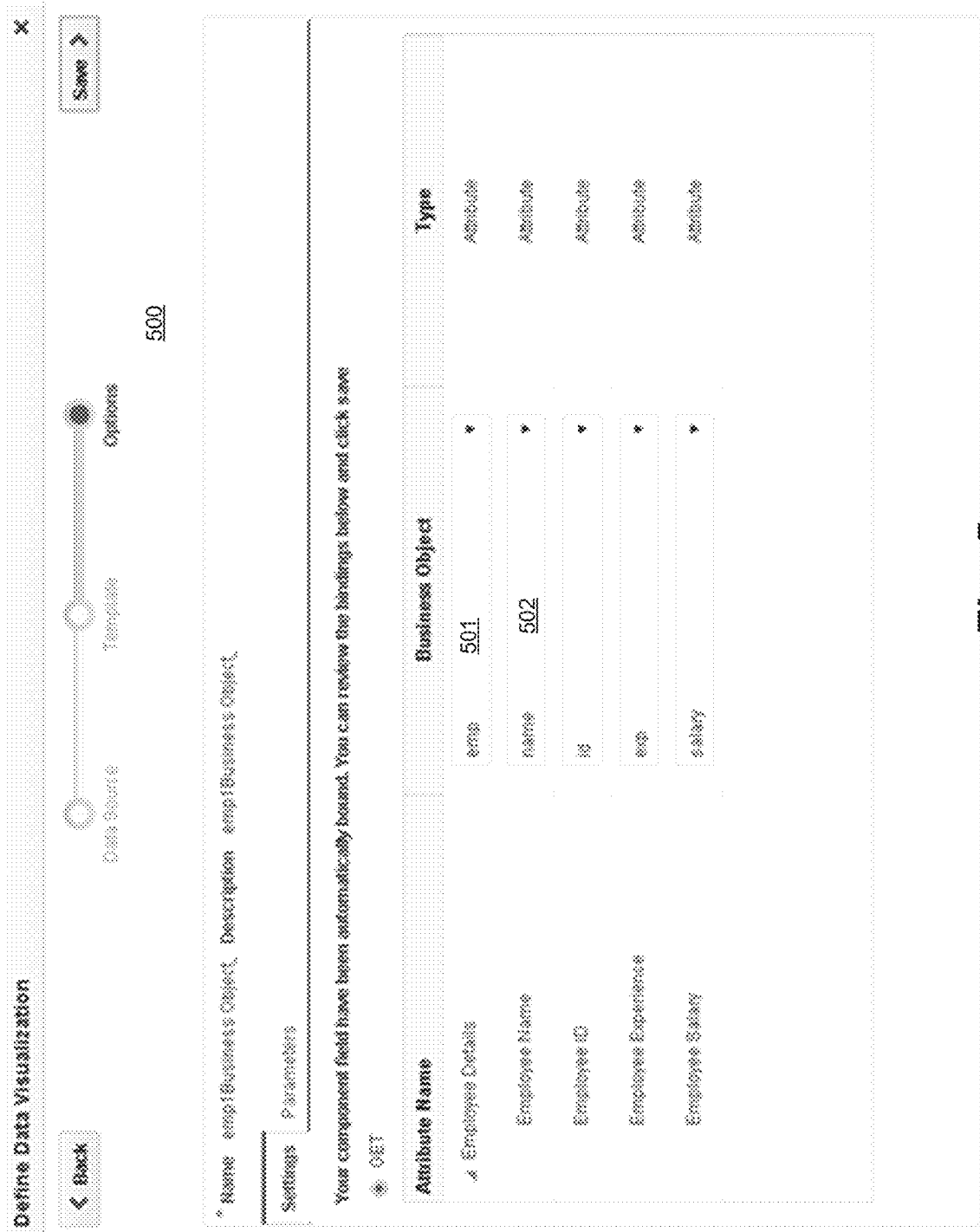
FIG. 5 is a screenshot of a user interface for binding attributes in accordance with one embodiment of the invention.

Based on the selected data source and visualization template, embodiments next provide a user interface showing exposed attributes in the selected template and attributes in the selected data source for mapping. FIG. 5 is a screenshot of a user interface 500 for binding attributes in accordance with one embodiment of the invention. User interface 500 includes a selection of database attributes (e.g., "emp" 501, "name" 502) that are from the selected data source and are pre-binded.

FIG. 6 is a screenshot of a user interface 600 in response to the selected data source, visualization template and attribute options in accordance with one embodiment of the invention. User interface 600 shows the resultant data visualization.

Figure 7A:
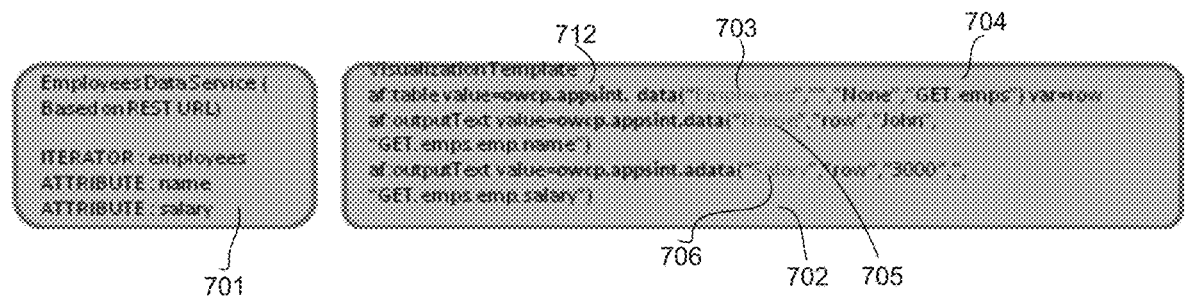
FIGS. 7A-7C illustrate autowiring for an ADF framework embodiment in accordance with one embodiment.
Figure 7B:
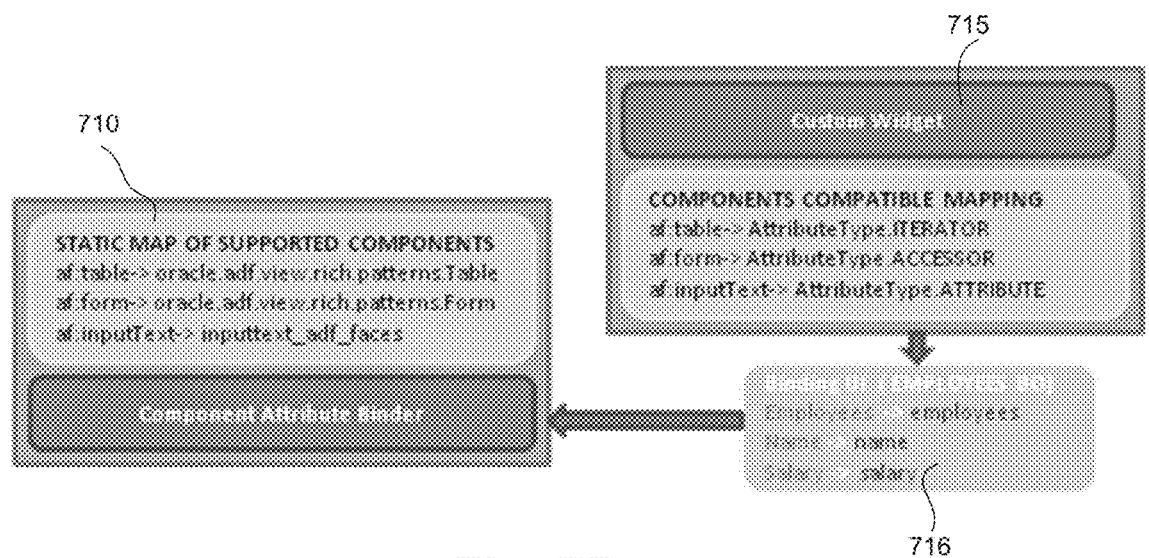
Figure 7C:
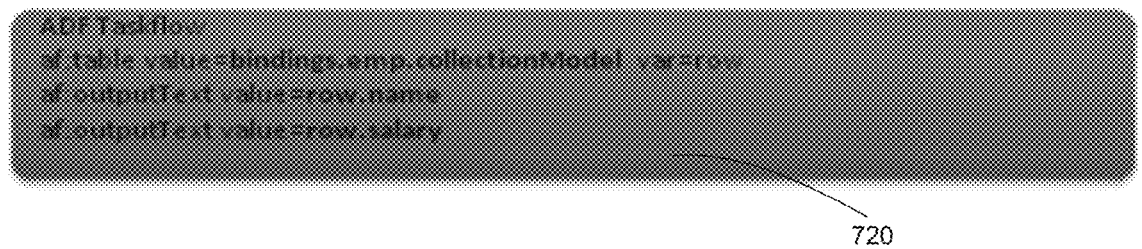

FIGS. 7A-7C illustrate autowiring for an ADF framework embodiment in accordance with one embodiment. FIG. 7A illustrates the inputs, and corresponds to the selections shown in FIGS. 3-5. At 701, the pre-created data source, corresponding to the selection of data source 301 of FIG. 3 is shown. As shown, the employee data is based on a REST URL, and includes selected attributes such as name and salary, and an ADF "iterator", which is a component that performs iteration to retrieve a list of employees.

FIG. 7A also includes a visualization template 702 that corresponds to the selection of visualization template 403 of FIG. 4. Template 702 specifies which table (i.e., list of records) is binded with which data. The name of the table is specified at 703, and the "GET emps" 704 indicates that employee data is extracted from the REST URL. Next, the columns that are shown are specified. In the example of FIG. 7A, two columns are specified and function as placeholders: column 705 that shows employee names, and column 706 that shows employee salaries. Template 702 further includes metadata in the form of specialized Expression Languages ("EL"). For example, at 712, the metadata "owcp.appsint" indicates that "Employee" should be replaced by the employee data fetched as part of the Get.emps REST URL call at runtime.

FIG. 7B illustrates the internal logic that performs the data binding in accordance with one embodiment. The FIG. 7B functionality is based in part on a data source introspection in which a data source exposes its data. In one embodiment, ADF data controls are used to perform the data source introspection. ADF data controls provide an abstraction of the business service's data model. The ADF data controls provide a consistent mechanism for clients and web application controllers to access data.

At 710, pre-defined mappings between UI components and data types is shown and retrieved in the component attribute binder. The custom widget 715 is the result of the selections shown in FIGS. 3-5, and the data is binded at 716.

FIG. 7C illustrates the output code in the form of an ADF task flow 720 in accordance with one embodiment that generates the output table (i.e., data visualization) shown in FIG. 6. ADF task flow 720 is a fully functional data bound ADF component.

In one embodiment, the following generic application integration ("AI") ELs, adapted for all frameworks, are implemented. These ELs are part of the visualization template, and are replaced by real data during implementation of the data visualization via parsing:

```
AI parameter (Signifies user input from UI)
{
Attributes:
    Display Name of Parameter - Business User friendly Name in UI
    Default Value - In case no data source Parameter qualifies for binding
    Data source Parameter Name - fully qualified Name that uniquely represent a data source
parameter
}
AI method (Signifies user action from UI)
{
Attributes:
    Display Name of Action - Business User friendly Name in UI e.g. update, Save, Cancel etc.
    Default Value - In case no data source Action qualifies for binding
    Data source Action Name - fully qualified Name that uniquely represent a data source
action
```

```
}
AI data (Signifies value to be displayed in UI)
{
Attributes:
    Display Name of Attribute - Business User friendly Name in UI e.g. "Employee Name"
    Default Value - hardcoded default Value
    Data source Attribute Name - fully qualified Name that uniquely represent a data source
action
    Parent UI Component Id - for UI components e.g. Input Text can present in the page or
inside
Table.
                    In case it is inside table then bindings may need to generated
differently
}
AI inout data (Signifies input field for which data is populated from search results e.g. in
place
search and update)
{
Attributes:
    Display Name of Attribute - Business User friendly Name in UI e.g. "Employee Name"
    Default Value - hardcoded default Value
    Data source Attribute Name (in) - fully qualified Name that uniquely represents a data
source
Attribute
    Data source Attribute Name (out) - fully qualified Name that uniquely represents a data
source
Attribute
}
```

One embodiment is implemented for an ADF framework. In this embodiment, example ELs are as follows:

```
#{owcp.appsint.method('Get Stock Details',",'None','GET',")}"
#{owcp.appsint.parameter('Stock Symbol',",'AAPL','GET.symbol',")}
#{owcp.appsint.data('Low',",'636.8','GET.StockQuote.Low',")}
#{owcp.appsint.inoutdata('Revenue',",'$120000',
'GET.opportunity.revenue','UPDATE.opportunity.revenue')}
```

In connection with the EL, embodiments define mapping between components and the type of data they may accept, which determines the bindings to be generated between the component and data source. These mapping can be defined generically but the components are technology/framework specific. The mappings are used to map the data between UI components and data source attributes. For example, a table can be created out of list of records, simple text can be created out of a single value, etc.

The following pseudo-code implements autowiring in accordance to one embodiment of the present invention. The below pseudo-code is for a generic implementation that can accommodate any framework, including ADF:

```
PHASE 1 : PARSE TEMPLATE
    START
        READ Template (file or stream)
        FOREACH Component in Template
            GET Attributes
            FOREACH Attribute
                IF (AttributeValue = AI EL)
                    READ EL
                    GET Associated Metadata
                    STORE in Memory
    END
PHASE 2 : BIND ATTRIBUTES
    START
        FOREACH Attribute
            GET Attributes
            FOREACH Attribute
                GET ComponentBinder (Component Binder can behave
                    differently based on component
type)
            IF ( AttributeValue = AI Parameter)
                ComponentBinder:doParameterBinding
            ELSE IF ( AttributeValue = AI Method)
                ComponentBinder:doMethodBinding
            ELSE IF ( AttributeValue =AI inoutdata)
                ComponentBinder:doinoutAttributeBinding
            ELSE IF ( AttributeValue = AI data)
                ComponentBinder:doAttributeBinding
    END
PSEUDO CODE : ComponentBinder:doAttributeBinding
    START
        GET UI Attribute mapping
        GET data source Attribute type
        (This can be automatically detected)
        IF (UI Attribute Type = data source Attribute Type)
            Replace UI placeholder Attribute with Data source Attribute
        ELSE
            Raise Error and notify User
    END
```

Figure 8:
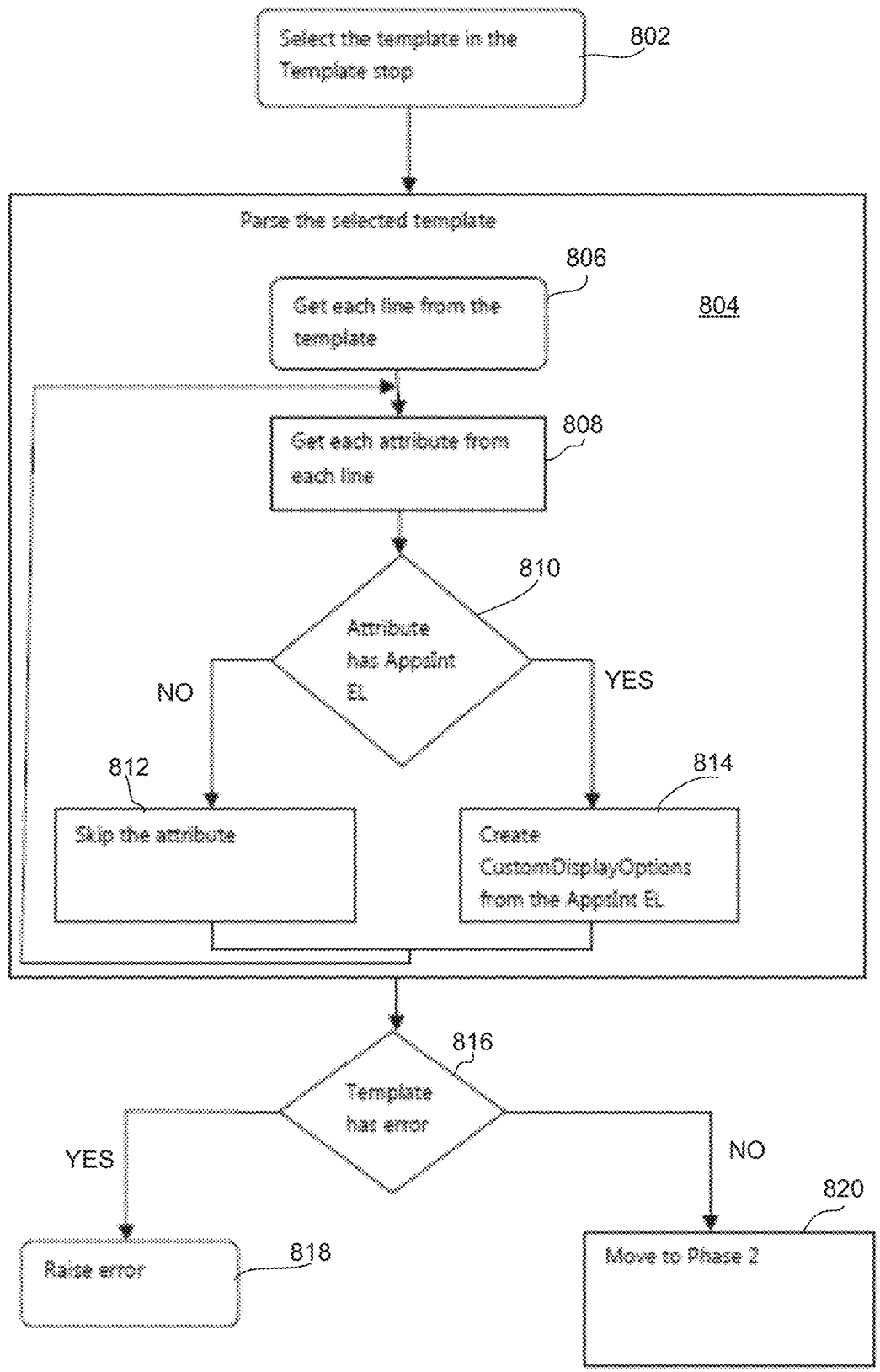
FIGS. 8 and 9 are flow diagrams of the functionality of the UI component wiring module of FIG. 2 and other elements in accordance with one embodiment of the present invention.
Figure 9:
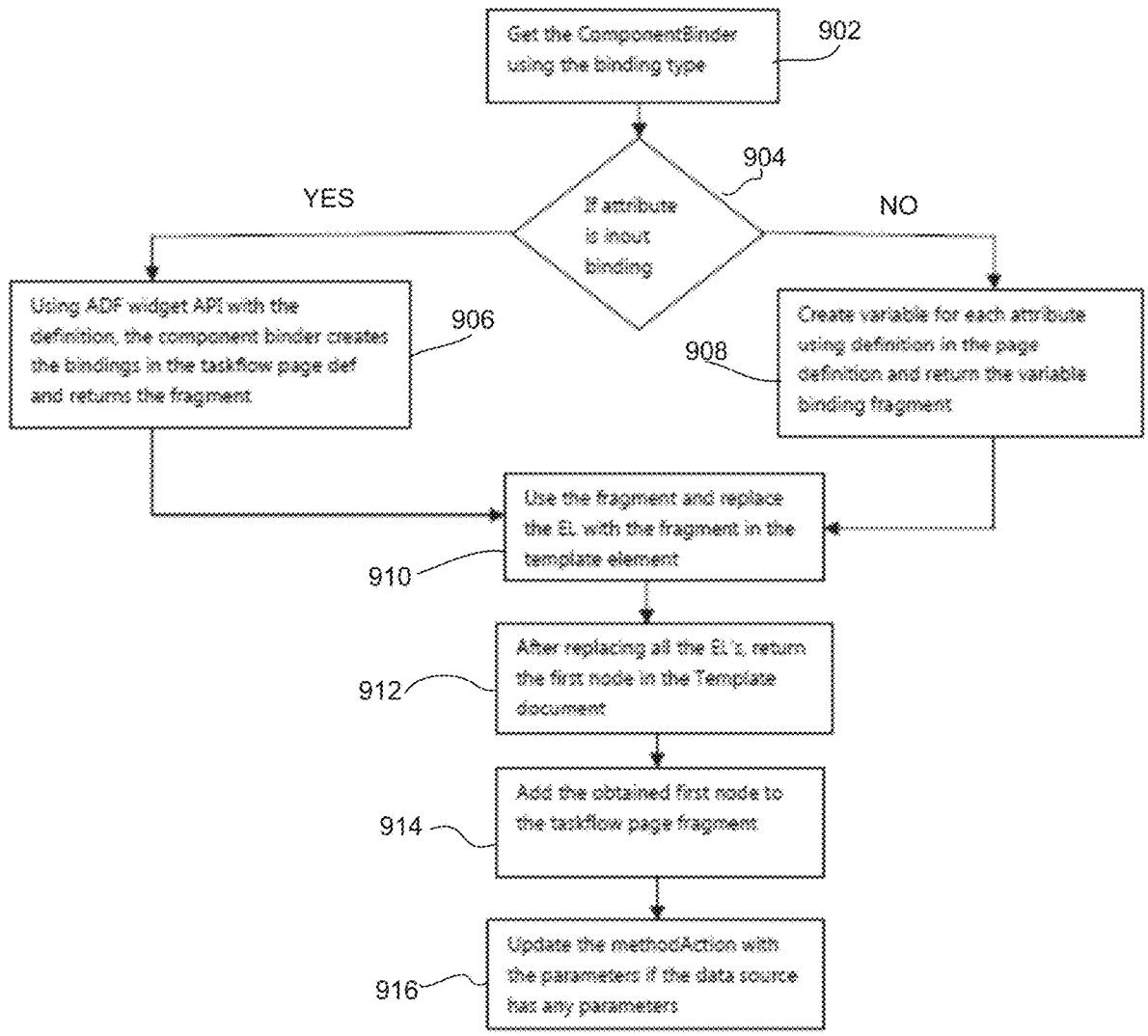

FIGS. 8 and 9 are flow diagrams of the functionality of UI component wiring module 16 of FIG. 2 and other elements in accordance with one embodiment of the present invention. The functionality shown in FIGS. 8 and 9 is for an ADF framework specific implementation, and it includes two phases, Phase 1 shown in FIG. 8 and Phase 2 shown in FIG. 9. In one embodiment, the functionality of the flow diagrams of FIGS. 8 and 9 (and FIG. 13 below) is implemented by software stored in memory or other computer readable or tangible medium, and executed by a processor. In other embodiments, the functionality may be performed by hardware (e.g., through the use of an application-specific integrated circuit ("ASIC"), a programmable gate array ("PGA"), a field programmable gate array ("FPGA"), etc.), or any combination of hardware and software.

Phase 1, shown in FIG. 8, at a high level parses the visualization template to determine the relevant ELs and go through each attribute. Phase 1 needs to be done only once per template. At 802, the template in the Template stop is selected.

The parsing is implemented in box 804. At 806, each line from the template is retrieved. At 808, each attribute from each line is retrieved. At 810, it is determined if the attribute has an "AppsInt" EL. In one embodiment, "appsint" indicates that the EL, as disclosed above in the above example, is an ADF EL. If no at 810, at 812 the attribute is skipped. If yes at 810, at 814, "CustomDisplayOptions" from the AppsInt EL is created. The functionality continues for each line in the template.

At 816, it is determined if the template has an error. If yes at 816, at 818 the error is raised. If no at 816, at 820 the functionality moves to Phase 2 in FIG. 9. Example of errors include (1) generic type errors common to all types of AIs, including AI parameter, AI method etc., such as the EL is specified in the template syntactically wrong; (2) EL Type specific errors (e.g., AI parameter) such as having a mandatory attribute that is missing EL; and (3) Template (.jsff fragment is in XML format) XML related errors (e.g., missing end tags) such as an XML Parsing error as is being handled by XML Parsers etc.

Phase 2, shown in FIG. 9, is performed every time a different data source is selected in one embodiment. For example, for the same template, a second, different REST URL may be used because it includes attributes not present in a 1$^{st}$ REST URL. Therefore, Phase 2 is used to rewire the entire template to the new data source. The functionality of Phase 2 performs ADF binding.

At 902, the ComponentBinder using the binding type is retrieved. At 904, it is determined if the attribute is "inout" binding. If Yes, at 906, using an ADF widget API with the definition, the component binder creates the bindings in the task flow page def and returns the fragment. If No at 904, at 908 a variable is created for each attribute using the definition in the page definition and the variable binding fragment is returned.

At 910, the fragment is used and the EL is replaced with the fragment in the template element. At 912, after replacing all the ELs, the first node in the Template document is returned. At 914, the obtained first node is added to the task flow page fragment. At 916, the methodAction is updated with the parameters if the data source has any parameters.

Figure 10:
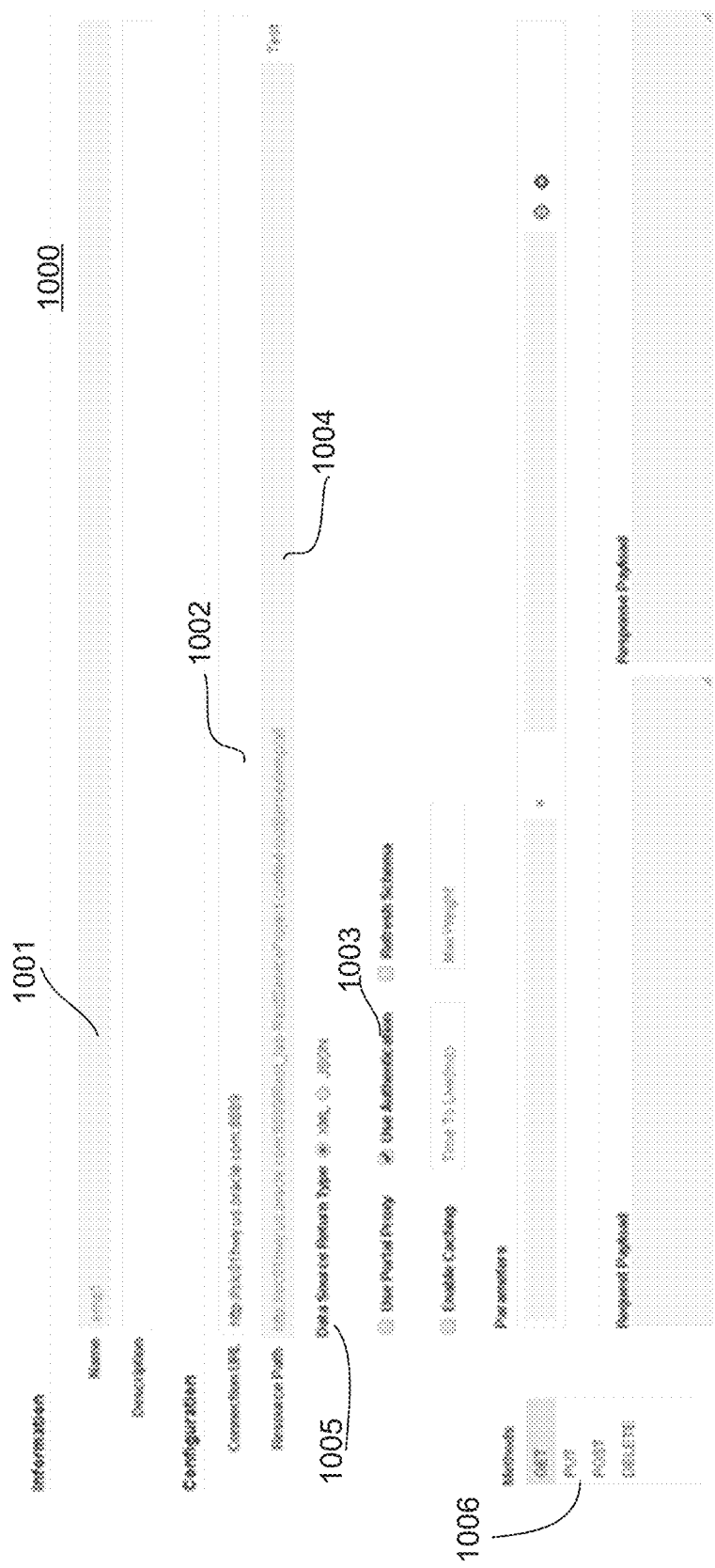
FIG. 10 is a screenshot for creating a new REST URL data source in accordance to embodiments of the invention.
Figure 11:
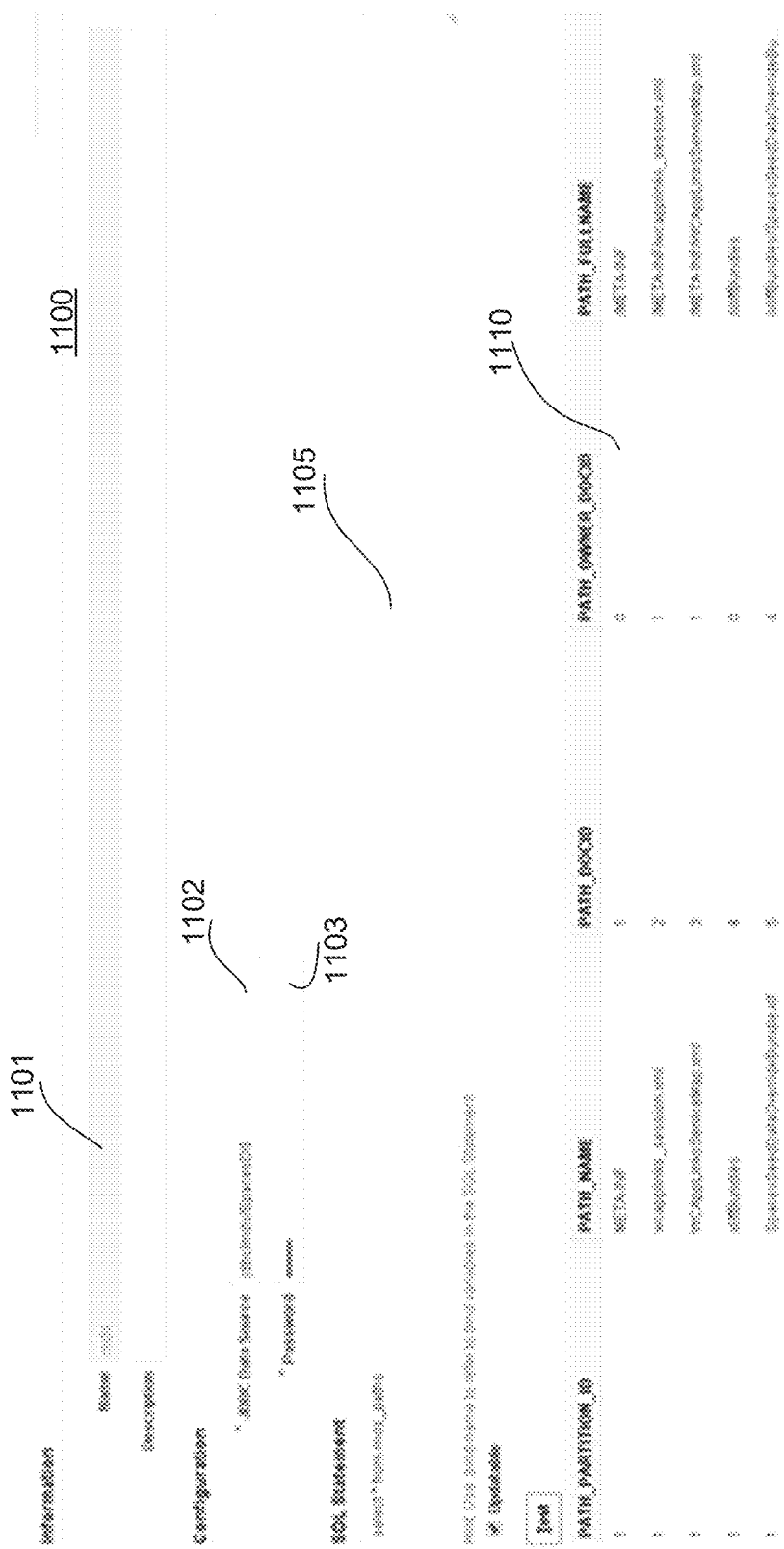
FIG. 11 is a screenshot for creating a new SQL data source in accordance to embodiments of the invention.

FIGS. 10 and 11 are screenshots showing how to create a new data source, which will ultimately become one of the available selections on screenshot 300 of FIG. 3. FIG. 10 is a screenshot 1000 for creating a new REST URL data source in accordance to embodiments of the invention. At 1001, the name of the data source is entered, and at 1002 the URL for the data source is specified. At 1003, the data source can be made secure. For example, a user name and password to access the URL can be specified. The resource path is specified at 1004. The data source return type is specified at 1005. The available methods are selected at 1006. The following is an example of data returned from a REST URL in XML form:

```
<emps>
    <emp>
        <dept>1</dept>
        <exp>4</exp>
        <id>0</id>
        <joiningDate>2014-01-02T00:00:00-08:00</joining Date>
        <name>Monty</name>
        <salary>500</salary>
        <userName>Default user</userName>
```

-continued

```
    </emp>
    <emp>
        <dept>1</dept>
        <exp>5</exp>
        <id>1</id>
        <joining Date>2014-01-02T00:00:00-08:00</joining Date>
        <name>Vicki</name>
        <salary>1000</salary>
        <userName>Default user</userName>
    </emp>
    <emp>
        <dept>1</dept>
        <exp>6</exp>
        <id>2</id>
        <joiningDate>2014-01-02T00:00:00-08:00</joiningDate>
        <name>Carl</name>
        <salary>2000</salary>
        <userName>Default user</userName>
    </emp>
    <emp>
        <dept>1</dept>
        <exp>7</exp>
        < id>3</id>
        <joiningDate>2014-01-02T00:00:00-08:00</joiningDate>
        <name>Asok</name>
        <salary>3000</salary>
        <userName>Default user</userName>
    </emp>
    ..... [more data]
</emps
```

FIG. 11 is a screenshot 1100 for creating a new SQL data source in accordance to embodiments of the invention. At 1101, the name of the data source is entered. At 1102 and 1103, the database data source and password is specified. At 1105, the SQL statement is specified. A test case is shown at 1110, which shows the data being returned by the given SQL statement at 1105.

In one embodiment, the visualization template can be created using JDeveloper from Oracle Corp. In this embodiment, the visualization template is for ADF. The attribute that is bound to the business object should have the specific EL, so that it can be binded to the business object during runtime. The exposed attribute in the custom template can be binded to attribute/parameter/method.

The following is an example place holder binding in the visualization template in accordance with an ADF embodiment:

Attribute Binding
{owcp.appsint.data('displayName','parentInformation', 'defaultValue','attribute binding hint',")} where
owcp.appsint.data—keyword to indicate that this attribute has to be bound to business object attribute. Only attributes that has EL that contains "owcp.appsint.data" will be the candidate for binding with business object attribute at runtime.

displayName—User friendly display name of the attribute.
parentInformation—If the attribute's component depends on the parent (iterator), then there is a need to specify the 'id attribute value as the parent iterator.
defaultValue—This is the default value for the component to render it in the JDeveloper during design time testing.
attribute binding hint—The xpath (operationName.accessor1.acessor2.attribute) for the attribute can be provided, so that the exposed attribute in the EL gets binded with the business object attribute by default. By default, if the user wants to override the binding, they can override it via the Options.

Parameter Binding:
{owcp.appsint.parameter('displayName','','defaultValue', 'parameter binding hint','')} where
owcp.appsint.parameter—keyword to indicate that this attribute has to be bound to business object parameter. Only attributes that has EL that contains "owcp.appsint.parameter" will be the candidate for binding with business object parameter at runtime.
displayName—User friendly display name of the attribute.
parentInformation—Parent information is not applicable for the parameter EL
defaultValue—This is the default value for the component to render it in the JDeveloper during design time testing.
parameter binding hint—The xpath (operationName.parameter1) for the parameter can be provided, so that the exposed attribute in the EL gets binded with the business object parameter by default.
Method Binding:
{owcp.appsint.method('displayName','','defaultValue', 'method binding hint','')} where
owcp.appsint.method—keyword to indicate that this attribute has to be bound to business object method. Only attributes that has EL that contains "owcp.appsint.method" will be the candidate for binding with business object method at runtime.
displayName—User friendly display name of the attribute.
parentInformation—Parent information is not applicable for the method EL
defaultValue—This is the default value for the component to render it in the JDeveloper during design time testing.
method binding hint—The operationName should be provided, so that the exposed attribute in the EL gets binded with the business object method by default.
InOut Binding:
{owcp.appsint.inout('displayName','','defaultValue','attribute binding hint','parameter binding hint')} where
owcp.appsint.inout—keyword to indicate that this attribute has to be bound to business object attribute & parameter.
displayName—User friendly display name of the attribute.
parentInformation—Parent information is not applicable for the method EL
defaultValue—This is the default value for the component to render it in the JDeveloper during design time testing.
attribute binding hint—The xpath for the attribute should be provided, so that the exposed attribute in the EL gets binded with the business object attribute by default.
Parameter binding hint—The xpath for the parameter has to be provided, so that it gets binded with the specified parameter by default.

As disclosed above, based on the selected display option of FIG. 4 and the attribute information selection of FIG. 5, bindings will be created at the backend and each binding will be assigned to a visualization template attribute. The page definition will also be updated with the respective information.

For example, the attributes in one embodiment before the binding will look like the following in the template:

```
<af:table value="#{owcp.appsint.metadata('Employee Information','','None')}" var="row" >
<af:column headerText="#{ owcp.appsint.metadata('Fourth Column Header','row','Attribute4')}" >
        <af:outputText value="#{owcp.appsint.metadata('Fourth Column','row','Text')}" />
    </af:column>
</af:table>
After binding, the visualization fragment will look like as follows:
<af:table value="#{bindings.emp.collectionModel}" var="row" id="t1">
    <af:column headerText="#{bindings.emp.ename.label}">
        <af:inputText value="#{row.ename}" />
    </af:column>
</af:table>
```

In one embodiment, the metadata/EL is captured in JavaServer Pages ("jspx"), which allows for the creation of dynamically generated web pages based on HTML, XML, or other document types. Using jspx allows the metadata information to be captured and to include a user friendly display name, whether the attribute has to be binded to a business object attribute name/value, parent information, etc. Further, there is easy maintenance as there is no additional metadata file. Further, it is user friendly so that a user can create the template (including the metadata) in JDeveloper and the user can validate it.

Figure 12:
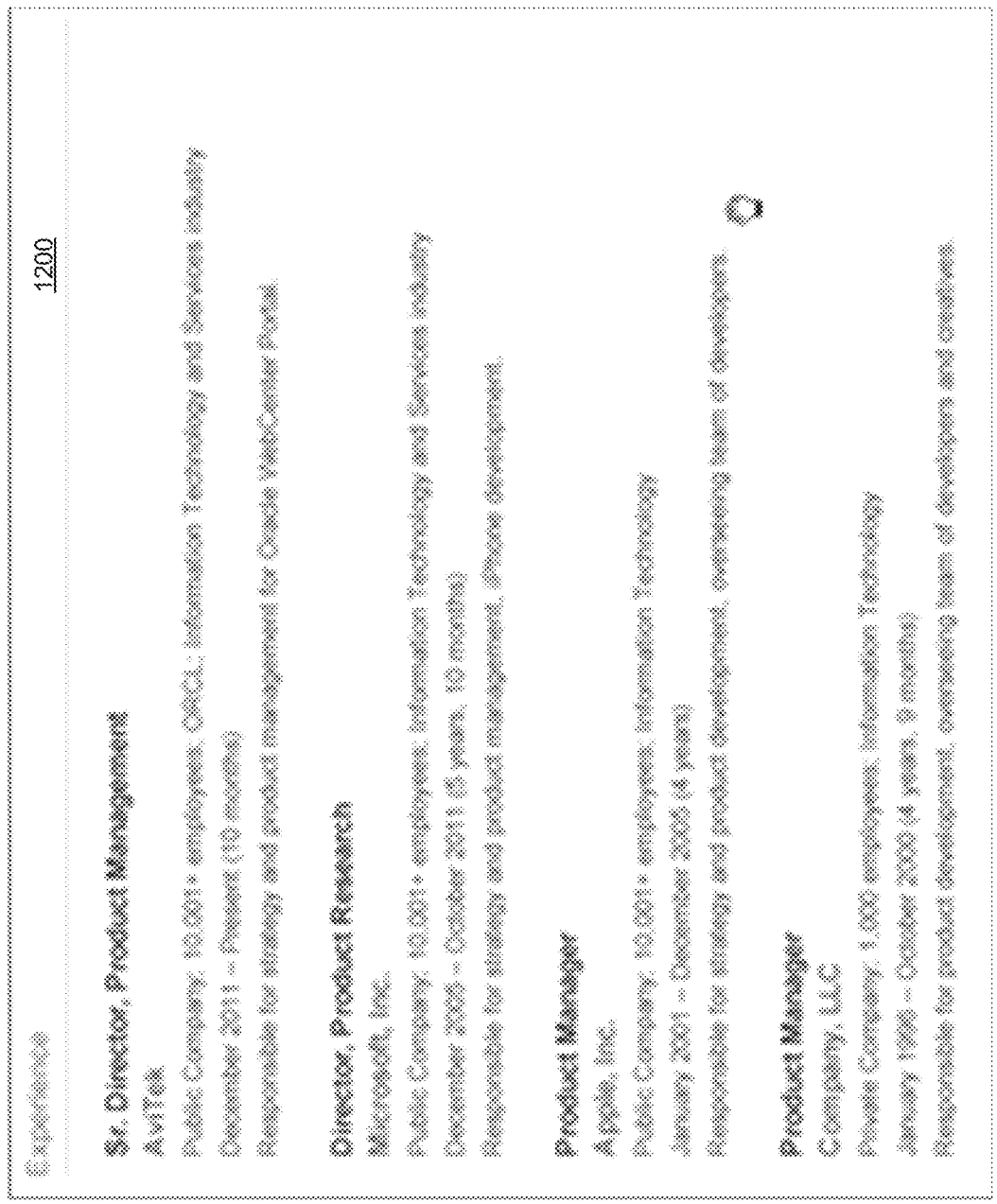
FIG. 12 is a screenshot that illustrates a visualization to show employee data in accordance to an embodiment of the invention.

FIG. 12 is a screenshot 1200 that illustrates a visualization to show employee data in accordance to an embodiment of the invention. The following is a custom visualization template example that generates screenshot 1200:

```
<?xml version='1.0' encoding='UTF-8'?>
<jsp:root xmlns:jsp="http://java.sun.com/JSP/Page" version="2.1"
        xmlns:af="http://xmlns.oracle.corn/adf/faces/rich"
        xmlns:f="http://java.sun.corn/jsf/core">
    <af:panelGridLayout id="pgl1" inlineStyle="width: 1000px; height: 1000px;">
        <af:gridRow height="100%" id="gr1">
            <af:gridCell width="100%" halign="stretch" valign="stretch" id="gc1">
            </af:panelHeader text="Employee Details" id="ph1">
            </af:panelHeader>
                <!-- Content -->
                <af:iterator id="i1" value="#{owcp.appsint.data('EmployeeDetails','','None','GET.emps.emp','')}
}"
                    <var="row">
                        <af:panelBox showDisclosure="false" showHeader="never" id="pb1" >
                            <af:panelGroupLayout id="pgl2" layout="vertical">
                                <af:outputText value="#{owcp.appsint.data('Employee
Name','i1','John','GET.emps.emp.name','')}" id="of1"
```

-continued

```
            <inlineStyle="font-weight: bold;font-size: larger;"/>
        <af:inputText label="Exmployee ID : " value="#{owcp.appsint.data('Employee
    ID','i1','1','GET.emps.emp.id',")}" id="it1"
                <readOnly="true"/>
        <af:panelGroupLayout id="pgl3" layout="horizontal">
            <af:outputText value="Having" id="ot1"/>
            <af:spacer width="5" id="s1"/>
            <af:outputText value="#{owcp.appsint.data('Employee
    Experience','i1','2','GET.emps.emp.exp',")}" id="ot2"
                <inlineStyle="font-weight: bold; font-style: italic;"/>
            <af:spacer width="5" id="s3"/>
            <af:outputText value="years(s) of experience" id="ot3"/>
        </af:panelGroupLayout>
        </af:panelGroupLayout id="pgl4" layout="horizontal"/>
        </af:outputText value="Getting Rs." id="ot4"/>
        </af:outputText value="#{owcp.appsint.data('Employee
    Salary','i1','30000','GET.emps.emp.salary',")" id="ot5"
                <inlineStyle="font-weight: bold;font-style: italic;"/>
        <af:spacer width="5" id= "s2"/>
        <af:outputText value= " as salary per month." id= "ot6"/>
        </af:panelGroupLayout>
    </af:panelGroupLayout>
    </af:panelBox>
        </af:iterator>
    </af:gridCell>
</af:gridRow>
</af:panelGridLayout>
</jsp:root>
```

Figure 13:
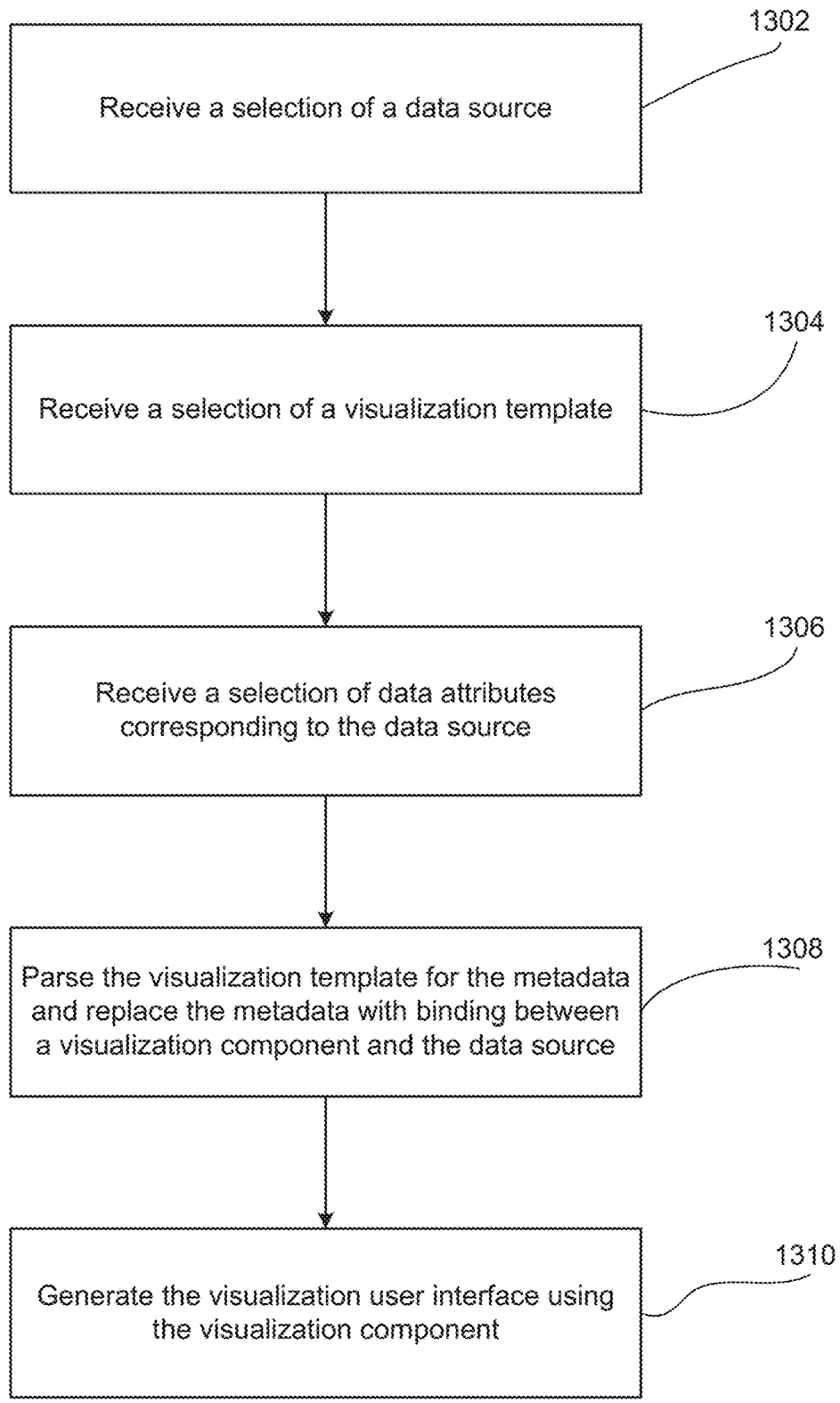
FIG. 13 is a flow diagram of the functionality of the UI component wiring module of FIG. 2 and other elements when generating a visualization user interface in accordance with one embodiment of the present invention.

FIG. 13 is a flow diagram of the functionality of UI component wiring module 16 of FIG. 2 and other elements when generating a visualization user interface in accordance with one embodiment of the present invention. The functionality of FIG. 13 is for any type of framework, including ADF.

At 1302, a selection of a data source is received. In one embodiment, the selection is made from a user interface such as shown in FIG. 3.

At 1304, a selection of a visualization template is received. The visualization template includes metadata, which in one embodiment is EL. In one embodiment, the selection is made from a user interface such as shown in FIG. 4.

At 1306, a selection of data attributes corresponding to the data source is received. In one embodiment, the selection is made from a user interface such as shown in FIG. 5.

At 1308, the visualization template is parsed for the metadata, and the metadata is replaced with binding between a visualization component and the data source. In one embodiment, the visualization component is an ADF task flow.

At 1310, the visualization user interface is generated using the visualization component. FIG. 6 illustrates an example visualization user interface.

As disclosed, embodiments use a visualization template to automatically bind user interface components to data sources and data source attributes. The selection of data sources, the visualization template, and data source attributes can be made by a user with minimal knowledge of the content or structure of back end data that forms the data sources.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to generate a visualization user interface (UI), the generating comprising:

receiving a selection of a data source from a plurality of different selectable data sources, each of the plurality of selectable data sources comprising a plurality of underlying data attributes that correspond to a type of the data source, wherein each of the plurality of selectable data sources comprises a different type of data source and different corresponding underlying data attributes;

receiving a selection of a visualization template from a plurality of different selectable visualization templates, each of the plurality of different selectable visualization templates comprises metadata, is not bound to a predetermined type of data source and comprises a layout of placeholders for a plurality of UI components to be rendered on the visualization UI, wherein the UI components comprise at least one of a table or a chart, and wherein each of the plurality of different selectable visualization templates comprises a different layout of placeholders;

based on the selected data source and the selected visualization template, automatically, without user intervention and after the data source is selected, binding the UI components and the data source by parsing the visualization template for the metadata, and replacing the metadata with generated binding between the UI components and the data source, the generated binding providing a connection between the selected data source and a synchronization between the UI components and the selected data source;

generating a first UI showing exposed attributes in the selected visualization template and the underlying data attributes from the selected data source that are binded; and generating the visualization UI using the UI components;

wherein the metadata comprises a mapping between the UI components and one or more types of the data source each UI component may accept;

wherein the metadata comprises an expression language (EL), and the EL is automatically replaced, without user intervention, with a first binding between a View and a Model layer, the EL comprising a place holder binding, the place holder binding comprising at least one of an attribute binding, a parameter binding, a method binding or an InOut binding.

2. The non-transitory computer readable medium of claim 1, wherein the first binding comprises data source introspection using Application Development Framework (ADF) data controls.

3. The non-transitory computer readable medium of claim 1, wherein the type of data source comprises one of a representational state transfer uniform resource locator (REST URL) data or database data.

4. The non-transitory computer readable medium of claim 3, wherein the REST URL data comprises JavaScript Object Notation or Extensible Markup Language.

5. The non-transitory computer readable medium of claim 1, wherein each of the UI components comprises an Application Development Framework (ADF) task flow.

6. The non-transitory computer readable medium of claim 5, wherein the replacing the metadata with the generated binding comprises executing an ADF iterator.

7. The non-transitory computer readable medium of claim 1, wherein the type of data source comprises a web service.

8. A method of generating a visualization user interface (UI), the method comprising:
   receiving a selection of a data source from a plurality of different selectable data sources, each of the plurality of selectable data sources comprising a plurality of underlying data attributes that correspond to a type of the data source, wherein each of the plurality of selectable data sources comprises a different type of data source and different corresponding underlying data attributes;
   receiving a selection of a visualization template from a plurality of different selectable visualization templates, each of the plurality of different selectable visualization templates comprises metadata, is not bound to a predetermined type of data source and comprises a layout of placeholders for a plurality of UI components to be rendered on the visualization UI, wherein the UI components comprise at least one of a table or a chart, and wherein each of the plurality of different selectable visualization templates comprises a different layout of placeholders;
   based on the selected data source and the selected visualization template, automatically, without user intervention and after the data source is selected, binding the UI components and the data source by parsing the visualization template for the metadata, and replacing the metadata with generated binding between the UI components and the data source, the generated binding providing a connection between the selected data source and a synchronization between the UI components and the selected data source;
   generating a first UI showing exposed attributes in the selected visualization template and the underlying data attributes from the selected data source that are binded; and
   generating the visualization UI using the UI components;
   wherein the metadata comprises a mapping between the UI components and one or more types of the data source each UI component may accept;
   wherein the metadata comprises an expression language (EL), and the EL is automatically replaced, without user intervention, with a first binding between a View and a Model layer, the EL comprising a place holder binding, the place holder binding comprising at least one of an attribute binding, a parameter binding, a method binding or an InOut binding.

9. The method of claim 8, wherein the first binding comprises data source introspection using Application Development Framework (ADF) data controls.

10. The method of claim 8, wherein the type of data source comprises one of a representational state transfer uniform resource locator (REST URL) data or database data.

11. The method of claim 10, wherein the REST URL data comprises JavaScript Object Notation or Extensible Markup Language.

12. The method of claim 8, wherein each of the UI components comprises an Application Development Framework (ADF) task flow.

13. The method of claim 12, wherein the replacing the metadata with the generated binding comprises executing an ADF iterator.

14. The method of claim 8, wherein the type of data source comprises a web service.

15. A visualization user interface generation system for generating a visualization user interface (UI), the system comprising:
   a processor;
   a storage medium coupled to the processor and storing instructions that when executed by the processor implement modules comprising:
   an option selector module that receives a selection of a data source from a plurality of different selectable data sources, each of the plurality of selectable data sources comprising a plurality of underlying data attributes that correspond to a type of the data source, wherein each of the plurality of selectable data sources comprises a different type of data source and different corresponding underlying data attributes, and receives a selection of a visualization template from a plurality of different selectable visualization templates, each of the plurality of different selectable visualization templates comprises metadata, is not bound to a predetermined type of data source and comprises a layout of placeholders for a plurality of UI components to be rendered on the visualization UI, wherein the UI components comprise at least one of a table or a chart, and wherein each of the plurality of different selectable visualization templates comprises a different layout of placeholders;
   a metadata parser module that, based on the selected data source and the selected visualization template, automatically, without user intervention, binds the UI components and the data source by parsing the visualization template for the metadata, and replacing the metadata with generated binding between the UI components and the data source, the generated binding providing a connection between the selected data source and a synchronization between the UI components and the selected data source; and
   a visualization generator module that generates a first UI showing exposed attributes in the selected visualization template and the underlying data attributes from the selected data source that are binded and generates the visualization UI using the UI components;
   wherein the metadata comprises a mapping between the UI components and one or more types of the data source each UI component may accept;
   wherein the metadata comprises an expression language (EL), and the EL is automatically replaced, without user intervention, with a first binding between a View and a Model layer, the EL comprising a place holder binding, the place holder binding comprising at least one of an attribute binding, a parameter binding, a method binding or an InOut binding.

16. The system of claim 15, wherein the first binding comprises data source introspection using Application Development Framework (ADF) data controls.

17. The system of claim 15, wherein the type of data source comprises one of a representational state transfer uniform resource locator (REST URL) data or database data.

18. The system of claim 17, wherein the REST URL data comprises JavaScript Object Notation or Extensible Markup Language.

19. The system of claim 15, wherein each of the UI components comprises an Application Development Framework (ADF) task flow.

20. The system of claim 19, wherein the metadata parser module replaces the metadata with the generated binding comprises executing an ADF iterator.

* * * * *